United States Patent [19]

Rohrbeck et al.

[11] Patent Number: 5,586,017

[45] Date of Patent: Dec. 17, 1996

[54] POWER GENERATOR COMPRISING A TRANSFORMER

[75] Inventors: Wolfgang Rohrbeck, Berlin; Hans Negle, Nahe; Martin Wimmer, Hamburg, all of Germany

[73] Assignee: U.S. Philips Corporation, New York, N.Y.

[21] Appl. No.: 447,598

[22] Filed: May 23, 1995

[30] Foreign Application Priority Data

May 27, 1994 [DE] Germany ............... 44 18 518.9

[51] Int. Cl.$^6$ .............. H01J 1/02; H01J 29/70; H02M 1/12; H02M 1/14
[52] U.S. Cl. ............................... 363/39; 315/411
[58] Field of Search ....................... 363/39, 40, 44, 363/45, 46, 47; 315/411, 399, 405, 408, 400

[56] References Cited

U.S. PATENT DOCUMENTS

| | | | |
|---|---|---|---|
| 3,596,167 | 8/1969 | Enge | 321/15 |
| 4,041,355 | 8/1977 | Onodera | 315/411 |
| 4,054,933 | 10/1977 | Praeg | 361/57 |
| 4,323,781 | 4/1982 | Baumann et al. | 250/422 |
| 4,818,855 | 4/1989 | Mongeon et al. | 235/440 |

FOREIGN PATENT DOCUMENTS 0141985  12/1987  European Pat. Off. ......... H02M 3/28

OTHER PUBLICATIONS

"The European Power Electronics Association", Brighton, Kim et al, Jun. 1993.

*Primary Examiner*—Stuart N. Hecker
*Assistant Examiner*—Bao Q. Vu
*Attorney, Agent, or Firm*—Jack D. Slobod

[57] ABSTRACT

A power generator, including a transformer with a primary winding arrangement and a secondary winding arrangement which is inductively coupled thereto, the primary winding arrangement forming a resonant circuit in conjunction with a capacitor, and a load being connected to the secondary winding arrangement. Therein, one winding arrangement of the transformer forms part of a series resonant circuit and, the other winding arrangement forms part of a parallel resonant circuit, the resonance frequency of the series resonant circuit is lower than the resonance frequency of the parallel resonant circuit, and the primary winding is connected to an alternating voltage generator so that an essentially sinusoidal alternating current flows through the primary winding.

20 Claims, 2 Drawing Sheets

5,586,017

POWER GENERATOR COMPRISING A TRANSFORMER

BACKGROUND OF THE INVENTION

The invention relates to a power generator, including a transformer with a primary winding arrangement and a secondary winding arrangement which is inductively coupled thereto, the primary winding arrangement forming a resonant circuit in conjunction with a capacitor, and a load being connected to the secondary winding arrangement. A "power generator" is to be understood to mean herein a generator capable of handling powers occurring in an X-ray generator for supplying filament current and high voltage to an X-ray tube. For filament current supply from 50 W to a few 100 W are then required, whereas generating the high voltage, (between 20 and 150 kV) requires powers of from 3 kW to more than 100 kW.

1. Description of the Related Art

A power generator of this kind, comprising a transformer without a ferromagnetic core, is known from EP-B2-141 985. It serves to generate high voltages in an X-ray generator. Its primary winding is connected in series with a direct voltage source and a switching device, a capacitor being connected parallel to the primary winding or the switching device. The switching device is periodically opened and closed, thus causing an approximately sawtooth-shaped current in the primary winding. In order to maximize the power transferred to the load and to minimize the energy fed back into the direct voltage source, inter alia the leakage inductance must be as small as possible or an as strong as possible inductive coupling should exist between the primary winding and the secondary winding. This requirement is very difficult to satisfy in the case of a high voltage transformer without an iron core, because the distance between the primary and the secondary winding must be as small as possible; on the other hand, a given minimum distance must be maintained between these components, as otherwise the high voltage strength is degraded.

Moreover, U.S. Pat. No. 3,596,167 describes a high voltage generator for an X-ray generator which comprises a plurality of cascade-connected transformers without a (closed) iron core. The transformers are coupled to one another via capacitive networks.

SUMMARY OF THE INVENTION

It is an object of the present invention to provide a power generator of the kind set forth which does not require a ferromagnetic core, at least not a ferromagnetic core which is closed. This object is achieved in accordance with the invention in that a) one winding arrangement of the transformer forms part of a series resonant circuit and the other winding arrangement forms part of a parallel resonant circuit, b) the resonance frequency of the series resonant circuit is lower than the resonance frequency of the parallel resonant circuit, c) the resonant circuit formed by means of the primary winding arrangement is connected to an alternating voltage source which generates an essentially sinusoidal alternating current through the primary winding arrangement with an operating frequency in the range of the resonance frequency of the parallel resonant circuit.

The resonance frequency of the parallel or the series resonant circuit is to be understood as the frequency at which the parallel or series resonant circuit per se (i.e. without inductive coupling between the primary and the secondary winding) resonates. The invention is based on the recognition of the fact that in conjunction with the external circuitry mentioned, the transformer behaves as an ideal transformer at a given frequency and in a range around this frequency, even when the inductive coupling between the primary and the secondary winding arrangement is comparatively loose and the impedance of the winding arrangement is not higher than the resistance of the load at said frequency.

It is to be noted that from "Taschenbuch der Hochfrequenztechnik" by Meinke/Gundlach, 2. Auflage, Berlin 1962, pp. 180/181 a circuit is known in which the primary winding of a transformer is complemented to a series resonant circuit by means of a capacitor, its secondary winding being complemented to a parallel resonant circuit by means of a further capacitor. The dual case (primary winding as parallel resonant circuit, secondary winding as series resonant circuit) is also known from this publication. Such circuits are used in the high frequency technique for the transformation of a resistance into a comparatively high-valued resistance and a comparatively low-valued resistance, respectively. In these circuits, not being intended for the transfer of high powers, the parallel resonant circuit and the series resonant circuit are both tuned to the same resonance frequency. The resonant circuits should be attenuated only slightly by the connected load resistance.

Furthermore, from a publication by Kim et al in "The European Power Electronics Association", Brighton, June 1993, a power generator is known which comprises a high voltage transformer whose primary winding is connected to an alternating voltage source via a capacitor and whose secondary winding acts as a parallel resonant circuit because of its self-capacitance. The relative position of the operating frequency of the alternating voltage source, the series resonance frequency and the parallel resonance frequency of this transformer, comprising a ferromagnetic core, are not indicated.

In a preferred embodiment of the invention, the primary winding arrangement forms part of a series resonant circuit which is connected to the alternating voltage source whose internal resistance is smaller in an absolute sense than the impedance of the primary winding arrangement at the operating frequency, the secondary winding arrangement forming part of a parallel resonant circuit. This embodiment, in which the secondary winding forms part of a parallel resonant circuit, is particularly suitable for generating high voltage in an X-ray generator.

In a further embodiment of the invention, the coupling factor of the inductive coupling between the primary winding arrangement and the secondary winding arrangement is between 0.1 and 0.9, preferably between 0.2 and 0.8. Use is made of the fact that the voltage transformation ratio in the power generator in accordance with the invention is dependent not only on the ratio of the inductances of the secondary and the primary winding arrangement, but also on the coupling factor. The smaller this coupling factor, the higher the voltage transformation ratio will be and the fewer turns will be required by the secondary winding arrangement in order to transform the primary alternating voltage to a given high voltage on the secondary side. A further advantage of the comparatively loose coupling consists in that the physical distances between primary and secondary winding arrangement can be chosen so that the required high voltage strength is achieved.

In practice, however, the coupling factor is limited to a minimum because as the coupling factor decreases component tolerances will have an increasing effect on the transformation behaviour of the circuit. Therefore, the coupling factor should be at least 0.1, and preferably at least 0.2.

In a further embodiment of the invention, the characteristic impedance of the parallel resonant circuit is of the order of magnitude of the load resistance or more. The optimum ratio of the characteristic impedance of the parallel resonant circuit to the resistance of the load is dependent on the coupling factor between the primary and the secondary winding arrangement; in the case of a coupling factor amounting to 0.1, the load resistance should be approximately seven times higher than the characteristic impedance and in the case of a coupling factor of 0.9, the load resistance should amount to approximately one-third of the characteristic impedance. When the arrangement is proportioned in this manner, it will also behave at least approximately as an ideal transformer when the operating frequency does not have exactly the value required for such behvaior or when the series resonance frequency or the parallel resonance frequency does not have exactly the prescribed value. Component tolerances or manufacturing tolerances can thus also be dealt with.

A further embodiment which is important for generating high voltages is characterized in that the operating frequency corresponds to the self-resonance frequency of the secondary winding arrangement. The secondary winding arrangement then resonates at the resonance frequency dictated by its self-capacitances (winding capacitances and the like) and it is no longer necessary to connect an expensive high voltage capacitor parallel to the secondary winding.

However, the parallel resonance frequency of a secondary winding arrangement cannot be simply adjusted to the optimum value for operation of the power generator. In order to avoid using an additional high voltage capacitor, in a further embodiment of the invention there is provided an additional parallel resonant circuit which is inductively coupled to the secondary winding arrangement and which is proportioned so that the secondary winding arrangement exhibits parallel resonance at the operating frequency. Even though this requires a capacitor as well as an additional inductance, the capacitor need not be designed for high voltages but only for a lower voltage as dictated by the inductance of the additional winding. The expenditure is thus reduced.

In a further embodiment of the invention, the additional winding is formed by a foil which is grounded at one point and is wound about a winding arrangement so that it electrostatically shields it from the other winding arrangement. The additional winding thus has a dual function. On the one hand it serves for tuning the parallel resonant circuit to the necessary frequency and on the other hand it provides electrostatic shielding between the primary and the secondary winding arrangement.

In conformity with the duality principle, analogous results can be achieved when the primary winding arrangement is connected to an alternating current generator and is complemented so as to form a parallel resonant circuit, and when the secondary winding arrangement forms pan of a series resonant circuit whose characteristic resistance is substantially higher than the resistance of the load connected thereto. The parallel resonant circuit must then be fed by an alternating current source having a high internal resistance and the load must be a low-resistance load. This embodiment is not very suitable for generating high voltages, but can be used, for example for powering the (low-resistance) filament of an X-ray tube.

BRIEF DESCRIPTION OF THE DRAWINGS

The invention will be described in detail hereinafter with reference to the drawings. Therein.

DESCRIPTION OF THE PREFERRED EMBODIMENTS

Figure 1:
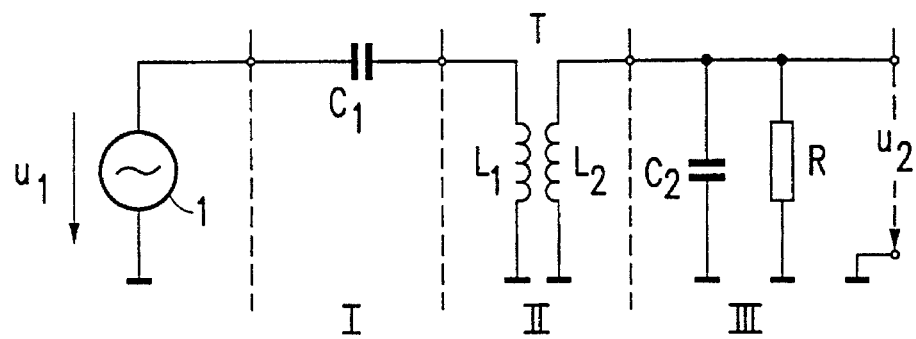
FIG. 1 shows a circuit diagram of a power generator in accordance with the invention.

As is shown in FIG. 1, the series connection of a capacitor $C_1$ and the primary winding $L_1$ of a transformer T is fed by an alternating voltage source 1 whose internal resistance is negligibly small relative to the characteristic impedance of the series resonant circuit formed by $L_1$ and $C_1$ (the characteristic impedance is the square root of the quotient $L_1/C_1$) and which generates a sinusoidal alternating current of frequency ω through $L_1$. A capacitor $C_2$ is connected parallel to the secondary winding $L_2$ of the transformer T, thus forming a parallel resonant circuit. Furthermore, parallel to the winding $L_2$ there is connected a resistance R which represents the circuit load.

Because the load resistance R is already included in the circuit, for the following calculation of the output voltage $u_2$ on the output terminals it is assumed that the circuit operates in the no-load condition, i.e. that no current flows across the output terminals. For this calculation the coupling factor describing the inductive coupling between the windings $L_1$ and $L_2$ is denoted by the letter k. It then holds that $$k^2 = M^2/(L_1 L_2) \qquad (1)$$

Therein, M is the mutual inductance between the two windings $L_1$ and $L_2$, and $L_1$ and $L_2$ represent the inductances of the primary winding $L_1$ and the secondary winding $L_2$, respectively. The following holds for the ratio of these inductances:

$$t^2 = L_2/L_1 \qquad (2)$$

For a high voltage generator t is large relative to 1.

For the calculation the circuit is subdivided into three sections, the first section I comprises the capacitance $C_1$ in the longitudinal branch, the second section II comprises the transformer T and the third section III comprises the parallel connection of the capacitor $C_2$ and the load resistance R. The three sections are considered as a quadrupole, the calculation of the transformation behavior being based on the cascade matrix thereof. As is known, a cascade matrix describes the relationship between the voltage $u_i$ and the current $i_i$ at the input of the quadrupole and the voltage $u_o$ and the current $i_o$ at its output in conformity with the equations $$u_i = a_{11} u_o + a_{12} i_o \qquad (3)$$

$$i_i = a_{21} u_o + a_{22} i_o \qquad (4)$$

The coefficients $a_{11} \ldots a_{22}$ represent the elements of a cascade matrix A. Therein, $a_{11}$ determines the voltage transformation and $a_{11}/a_{21}$ denotes the input resistance of the quadruple in the absence of a load at the output side ($i_o=0$). As is known, the cascade matrix of a plurality of cascade-connected quadrupoles follows from the product of the cascade matrices of the individual quadrupoles.

Thus, the following equation holds for the cascade matrix $A_g$ of the overall quadruple present between the voltage source 1 and the output terminals 2 in FIG. 1:

$$A_g = A_I A_{II} A_{III} \tag{5}$$

Therein, $A_I$, $A_{II}$ and $A_{III}$ are the cascade matrices of the quadrupoles in the sections I, II and III.

The circuit behavior of essential importance to the invention is obtained when the parallel resonance of the circuit $L_2$, $C_2$ occurs at the frequency ω (more exactly speaking: at the angular frequency ω; for the relationship between the angular frequency ω and the frequency f it holds in known manner that $\omega=2\pi f$) of the voltage $u_1$ supplied by the alternating voltage source and when the series resonance frequency of the circuit $L_1$, $C_1$ is the factor $\sqrt{(1-k^2)}$ lower than the resonance frequency of the parallel resonant circuit $L_2$, $C_2$. This corresponds to the equations $$\omega^2 L_1 C_1 (1-k^2) = 1 \tag{6}$$

$$\omega^2 L_2 C_2 = \omega^2 t^2 L_1 C_2 = 1 \tag{7}$$

When the transformer comprises a plurality of secondary windings, a plurality of parallel resonances may occur. The foregoing then relates to the lowest parallel resonance frequency. The same holds when a primary winding arrangement consisting of several sub-windings is present.

When the three cascade matrices are multiplied by one another in conformity with the equation (5), the following cascade matrix is obtained for the circuit of FIG. 1 at the operating frequency defined by the equations (6) and (7):

$$A_g = \begin{pmatrix} \frac{k}{t} & 0 \\ \frac{t}{kR} & \frac{t}{k} \end{pmatrix} \tag{8}$$

This matrix corresponds to the matrix of an ideal transformer loaded at the output side by a load resistance R. An ideal transformer transfers the power without loss and has an infinitely high no-load input impedance and no leakage (k=1). The circuit shown in FIG. 1 deviates from this ideal transformer merely in that this exact behavior occurs only for a single operating frequency, defined by the equations (6) and (7), and that the voltage transformation ratio is not given by t alone, but by t/k.

This behavior of the circuit shown in FIG. 1 also occurs in the case of a comparatively high leakage or a comparatively loose coupling between the primary and the secondary winding, and also when the alternating current resistance of the secondary winding is of the order of magnitude of the load resistance or even less. A high voltage generator for an X-ray tube, therefore, can be realized by means of an (air) transformer whose secondary winding has an inductance of some tenths or a few Henry at a comparatively low operating frequency (from 20 to 50 kHz for which alternating voltage sources can be readily realized by means of contemporary power semiconductors). A real load resistance R constitutes a purely real load of the alternating voltage generator 1, the resistance transformation ratio being given by the factor $t^2/k^2$.

The fact that the voltage transformation ratio is given by the factor t/k means that in order to achieve a given output voltage $U_2$ for a given voltage $u_1$, the secondary inductance may be a factor k smaller than in the case of a leakage-free transformer (k=1). This offers a dual advantage for an X-ray generator, for example in a high voltage generator, which is capable of transforming a voltage of a few hundreds of volts into a voltage of, for example 150 kV: on the one hand a secondary winding comprising fewer turns can then be used, and on the other hand the distance between primary winding and secondary winding can be made so large as required for reasons of high voltage strength, without the resultant reduction of the inductive coupling between primary and secondary winding of the transformer having negative effects.

The equation (8) for the cascade matrix of the overall quadrupole has been deduced subject to the condition that the inductances $L_1$, $L_2$ and the capacitors $C_1$, $C_2$ are loss-free components and that the internal resistance of the alternating voltage source is zero, i.e. that the series or the parallel resonant circuit have an an infinitely high Q. However, the transformation behaviour described by the equation (8) is still suitably approximated when the series and the parallel resonant circuit have an adequate Q, for example a Q higher than 20 and preferably higher than 50. A further condition consists in that the load resistance R transformed in the primary circuit by the factor $k^2/t^2$, is high in comparison with the loss resistance representing the resistive losses in the series resonant circuit, and that the loss resistance occurring due to resistive losses in the secondary circuit parallel to $L_2$ and $C_2$ is low in comparison with the load resistance R.

The equation (8) for the matrix $A_g$ is exact only for the angular frequency ω defined by the equations (6) and (7). Beyond and below this value ω, the real values of the matrix elements of the matrix $A_g$ change into complex and frequency-dependent values. This means that a phase shift occurs between input current and input voltage, i.e. that blind currents flow. The transformation behavior defined by the equation (8), however, also occurs in a given range around the frequency defined by the equations (6) and (7). It has been found that the frequency range in which the derived relation still holds with adequate accuracy is dependent on the ratio of the load resistance R to the characteristic impedance Z of the parallel resonant circuit $L_4$, $C_2$; the characteristic impedance corresponds to the square root of the quotient $L_2/C_2$.

Figure 2:
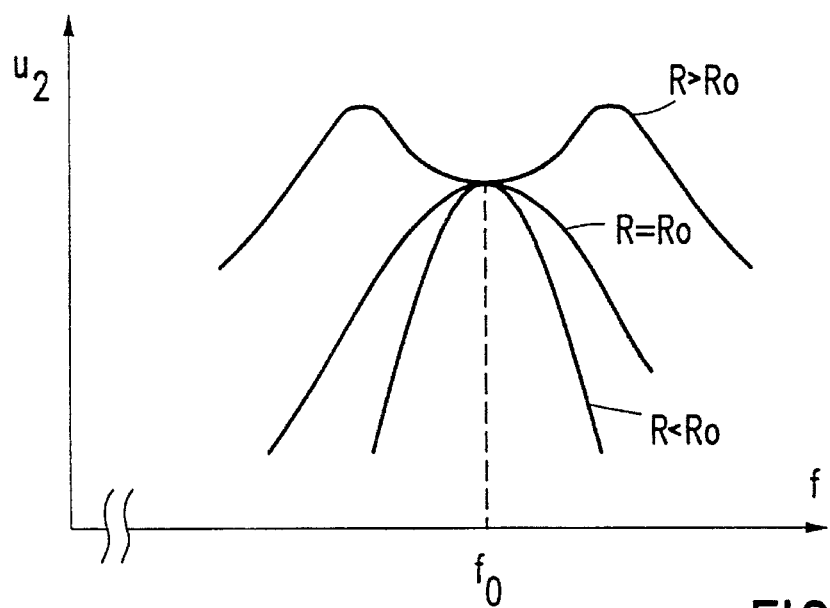
FIG. 2 illustrates the frequency dependency of the output voltage for various load resistances.

FIG. 2 shows the output voltage $u_2$ as a function of the frequency f of the alternating voltage $u_1$ supplied by the alternating voltage generator 1. The frequency derived from the equations (6) and (7) is denoted by $f_o$. Three different curves are plotted with the load resistance R as the parameter. For a load resistance $R=R_o$ a flat curve is obtained, in which case the following holds for this resistance:

$$R_o = Z \times \frac{\sqrt{(1-k^2)/2}}{k} \tag{9}$$

When instead use is made of a load resistance larger than $R_o$, the output voltage $u_2$ exhibits a relative minimum at the frequency $f_o$ and a maximum occurs to both sides of the frequency $f_o$ given by the equation (1). In the case of a smaller resistance R, a curve is obtained whose band width is narrower than for $R=R_o$.

The bandwidth of the transformation curve for a load resistance $R=R_o$ is dependent on the coupling factor k; the bandwidth is greater as k is greater. For the 3 dB limit frequencies $f_{1,2}$ it holds that:

$$\frac{f_{1,2}}{f_0} = \sqrt{1+v^2} \pm v, \text{ where } v = \frac{k}{2\sqrt{1-k^2}} \tag{10}$$

therefore, for the circuit shown in FIG. 1 to behave substantially as an ideal transformer within a given bandwidth around the frequency $f_o$, the equations (6) and (7) need not be exactly satisfied in practice. This means that the desired behavior is also achieved when the operating frequency is in a given range beyond or below the value $f_o$, i.e. between the 3 dB limit frequencies $f_1$ and $f_2$. The same holds when the resonance frequencies of the series remnant circuit or the parallel resonant circuit do not exactly have the value given by the equation (6) or (7), respectively. It has been found that the permissible frequency deviations may amount to approximately 5% without giving rise to a significant deviation from the desired behavior. This holds for coupling factors of between 0.1 and 0.9, notably between 0.2 and 0.8. The circuit is thus insusceptible to manufacturing tolerances or component tolerances. Therefore, use can be made of, for example capacitors $C_1$ and $C_2$ whose capacitance does not have exactly the value calculated by the equations (6) and (7) just but a normal commercial value.

Figure 3:
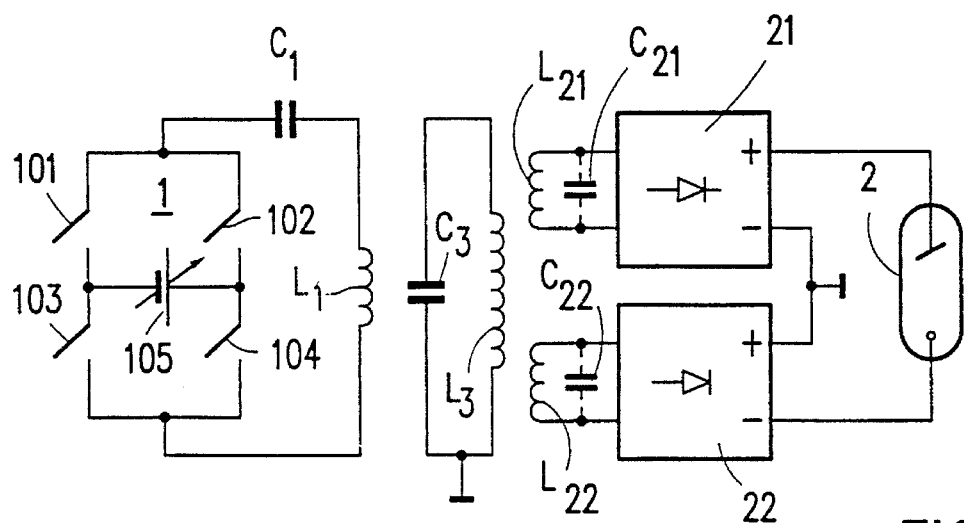
FIG. 3 shows a high voltage generator in accordance with the invention for an X-ray tube.

FIG. 3 shows an embodiment of the invention in the form of high voltage generator for an X-ray tube 2. As in FIG. 1, an alternating voltage source 1 is connected to the series connection of a capacitor $C_1$ and a primary winding $L_1$ of a transformer. However, the alternating voltage source consists of an adjustable direct voltage source 105 and an inverter which comprises the switches 101 . . . 104 and which connects the direct voltage source 105 to the series connection $L_1$, $C_1$ in one half period of a periodic oscillation with one polarity, and with the opposite polarity in the other half period. Thus, a square-wave voltage occurs in the series circuit, but the current through the inductance $L_1$ is substantially sinusoidal because the switches 101 . . . 104 are switched at a rate such of the parallel resonance frequency of the resonant circuit consisting of $L_2$ and $C_2$. The odd harmonics of the parallel resonance frequency in the spectrum of the square-wave voltage are essentially attenuated.

The primary winding $L_1$ is inductively coupled, be it without a ferromagnetic core, to the two secondary windings $L_{21}$ and $L_{22}$ of the high voltage transformer. The (stray) winding capacitances $C_{21}$ and $C_{22}$ are represented by dashed lines parallel to these windings. The high voltage across the secondary winding $L_{21}$ is rectified by a rectifier 21 whose positive output is connected to the anode of the X-ray tube 3 and whose negative output is connected to the positive output of a rectifier 22 whose negative output is connected to the cathode of the X-ray tube 3 and whose input is connected to the secondary winding $L_{22}$. The secondary windings $L_{21}$ and $L_{22}$ are thus connected in series via a part of the rectifier components. The X-ray tube operates with different voltages U, for example in the range between 40 kV and 150 kV. To this end, the direct voltage supplied by the direct voltage source 105 is preferably electronically adjusted.

As seen from the secondary windings the X-ray tube acts, in conjunction with the rectifiers 21 and 22, as a resistor R valued R=gU/I, in which g is a factor which is dependent on whether the X-ray voltage is smoothed or not. When the voltage is smoothed, g=½. For an X-ray exposure, X-ray currents I of between, for example 10 mA and 1 A may be preset. In the case of fluoroscopy, the X-ray currents may even be smaller. R can thus vary in a very wide range. Therefore, the adaptation between the (variable) load and the characteristic impedance Z is effectively chosen for a working point in the upper power zone of the X-ray tube in conformity with the equation (9).

If the secondary windings $L_{21}$ and $L_{22}$ were not inductively coupled to one another, for the same data of the windings $L_{21}$, $L_{22}$ the parallel resonance frequency would be defined by the magnitude of one of the inductances $L_{21}$ or $L_{22}$ and the capacitance acting parallel thereto. Generally speaking, however, inductive coupling exists between the secondary windings. Consequently, the overall inductance of the secondary circuit may be larger than the sum of the two inductances $L_{21}$ and $L_{22}$, and the coupling factor between the primary inductance $L_1$ and the overall inductance may be larger than the coupling factor between $L_1$ and $L_{21}$ or $L_1$ and $L_{22}$ alone. The coupling factor k between the primary inductance $L_1$ and the overall inductance is then decisive for the determination of the series resonance frequency in accordance with the equation (6), and the overall inductance of the secondary circuit represents the value $L_2$ which is decisive in respect of the determination of the characteristic impedance Z. The associated value of $C_2$ is obtained by measurement of the parallel resonance frequency or by calculation of the capacitance of the secondary winding arrangement from the series connection of the capacitances acting parallel to the secondary windings.

The voltage transformation ratio t/k is higher as the coupling factor k is smaller, so that the number of turns of the secondary windings $L_{21}$ and $L_{22}$ (for a predetermined primary inductance $L_1$) may be smaller for a small value of k than for a large value. The value k, however, cannot be chosen to be arbitrarily small, because as k is smaller the bandwidth within which the circuit operates as an ideal transformer becomes narrower. Therefore, in practice the coupling factor k between the primary and second winding of the high voltage transformer should at least have a value k=0.1, but preferably at least 0.2. Moreover, as k decreases the magnetic leakage fields of the high voltage transformer increase, and hence also the component of the electric power which is inductively coupled into the surrounding metal parts, for example into the metal housing of the high voltage transformer which is not shown in FIG. 3, instead of into the secondary winding.

In practice it is not simply possible to construct the secondary windings in such a manner that the equation (7) is satisfied merely by means of the winding capacitances of the winding arrangement $L_{21}$, $L_{22}$. A suitably chosen capacitor can be connected parallel to the secondary windings, but such a capacitor is expensive because it must be designed for the high voltage. In order to tune the secondary windings $L_{21}$ and $L_{22}$ to the parallel resonance frequency given by the equation (7), therefore, an additional parallel resonant circuit with an inductance $L_3$ and a capacitor $C_3$ is provided. The inductance $L_3$ is arranged so that it has equal coupling factors relative to the secondary windings and that preferably a smaller coupling factor exists relative to the primary winding. The capacitance of the capacitor $C_3$ is chosen so that in these circumstances parallel resonance occurs at the operating frequency of the inverter. It has been found that the overall arrangement in a first approximation corresponds to the parallel connection of an additional secondary resonant circuit whose capacitance complements the capacitance conductively coupled to the load. The L/C ratio of the additional circuit does not affect the function of the arrangement, but determines the magnitude of the currents and voltages occurring in this circuit.

The inductance $L_3$ can be conceived so that it additionally takes over the function of an electrostatic protective shield as prescribed in X-ray generators for medical diagnosis. This protective shield, arranged between the primary winding and the secondary windings, is grounded and serves to preclude flashovers between the primary and secondary winding arrangement.

Figure 4:
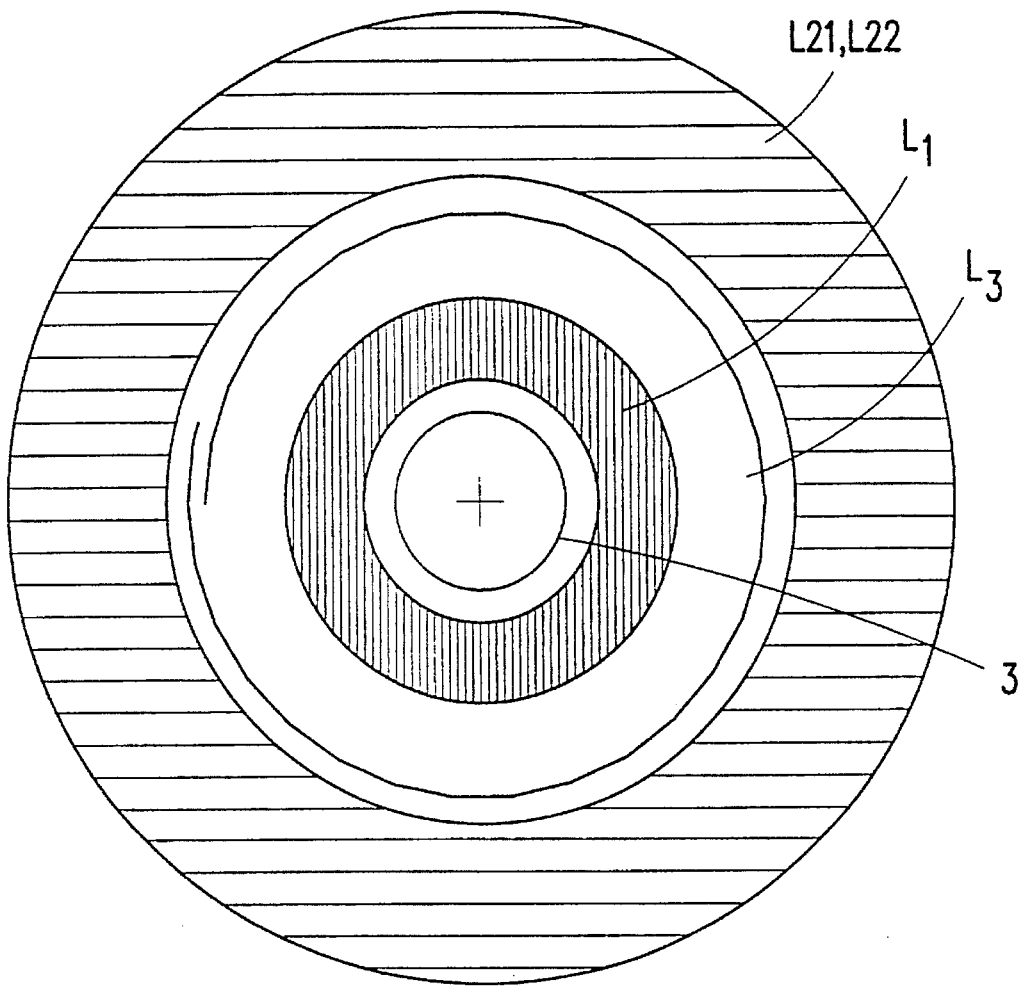
FIG. 4 shows the winding lay-out of the transformer used therein.

FIG. 4 is a sectional view of a high voltage transformer which is suitable for this purpose, the insulating members on which the windings are wound have been omitted for the sake of simplicity, only the copper cross-sections of the windings being shown. The winding $L_1$ is shaped as a cylinder which extends perpendicularly to the plane of drawing of FIG. 4. The secondary windings $L_{21}$ and $L_{22}$, having an inner diameter which is substantially larger than the outer diameter of the primary winding $L_1$, are arranged so as to be coaxial with respect to the primary winding and offset relative to one another in the axial direction. In the space between the primary winding $L_1$ and the secondary windings $L_{21}$ and $L_{22}$ there is provided a grounded copper foil $L_3$ which encloses the primary winding over its entire length and which hence electrostatically shields the primary and secondary windings, from one another. The copper foil is wound several times (the diagrammatic representation of the Figure shows only one turn) about the symmetry axis of the arrangement, resulting in an inductance $L_3$ which forms a parallel resonant circuit in conjunction with the capacitor $C_3$. The distance between the inductance $L_3$ formed by the foil and the inner circumference of the secondary winding $L_{21}$, $L_{22}$ is then smaller than the distance from the outer circumference of the primary winding $L_3$, so that the coupling factor between $L_3$ and the secondary windings is greater than that between $L_3$ and the primary winding; the distance between $L_3$ and the secondary windings, however, is sufficiently large to provide the necessary high voltage strength.

In the described embodiment the transformer did not have any ferromagnetic core whatsoever. The invention, however, can also be used in transformers comprising a non-closed ferromagnetic core, preferably of a ferrite material. This is because closed ferrite cores of the size required for the high voltage transformer of an X-ray generator are practically impossible to realized at present. However, a transformer comprising a rod-shaped ferrite core or several of such cores can be readily manufactured.

Instead of using an additional parallel resonant circuit, the tuning to the operating frequency ω can also be realized by means of a ferrite member 3 of small dimensions (in comparison with the axial dimensions of the primary winding), which member is arranged in a given position relative to the secondary winding, for example inside the primary winding as denoted by a dashed line in FIG. 4. The variation of the coupling factor k and the primary inductance $L_1$ thus also induced can be compensated for by changing the inductance transformation ratio t (changing the primary winding number).

Figure 5:
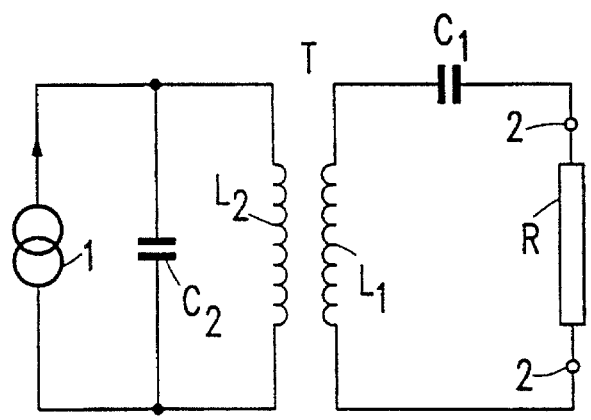
FIG. 5 shows a circuit diagram of an embodiment which is dual to FIG. 1.

In the described embodiment in the primary a series resonant circuit is provided. However, utilizing the principle of duality it is also possible to use in the primary a parallel resonant circuit and in the secondary a series resonant circuit, as shown in FIG. 5; the equations (6) and (7) must then be satisfied by the series and parallel resonance frequencies. In this case a high-resistance alternating current source 1 must be provided instead of an alternating voltage source, and for the load a resistor R is required which is small in comparison with the characteristic impedance of the series resonant circuit $L_2$, $C_2$. Thus, the properties of the circuit arrangement in respect of voltages, currents and transformation ratios are exchanged, and the special advantages in respect of the transformation of voltages apply to the current transfer. This embodiment of the invention is suitable, for example for feeding a filament of an X-ray tube. In a transformer used for these purposes a large transformation ratio is not as important, as a high voltage strength, because the secondary winding coupled to the cathode is exposed to a negative high voltage potential which corresponds to half the voltage on the X-ray tube and because the primary winding usually carries ground potential.

We claim:

1. A power generator, comprising a transformer with a primary winding arrangement and a secondary winding arrangement which is inductively coupled thereto, the primary winding arrangement forming a resonant circuit in conjunction with a capacitor, and a load being connected to the secondary winding arrangement, characterized in that a) one winding arrangement of the transformer forms part of a series resonant circuit and the other winding arrangement forms part of a parallel resonant circuit, b) the resonance frequency of the series resonant circuit is lower than the resonance frequency of the parallel resonant circuit, c) the resonant circuit formed by means of the primary winding arrangement is connected to an alternating voltage source which generates an essentially sinusoidal alternating current through the primary winding arrangement with an operating frequency in the range of the resonance frequency of the parallel resonant circuit.

2. A power generator as claimed in claim 1, characterized in that the primary winding arrangement forms part of a series resonant circuit which is connected to the alternating voltage source whose internal resistance is smaller, in an absolute sense, than the impedance of the primary winding arrangement at the operating frequency, and that the secondary winding arrangement forms part of a parallel resonant circuit.

3. A power generator as claimed in claim 2, characterized in that the coupling factor of the inductive coupling between the primary winding arrangement and the secondary winding arrangement is between 0.1 and 0.9.

4. A power generator as claimed in claim 2, characterized in that the characteristic impedance of the parallel resonant circuit is of the order of magnitude of the load resistance or more.

5. A power generator as claimed in claim 2, characterized in that the secondary winding arrangement comprises a plurality of series-connected sub-windings.

6. A power generator as claimed in claim 5, characterized in that the sub-windings are inductively coupled to one another.

7. A power generator as claimed in claim 2, characterized in that the operating frequency corresponds to a self-resonance frequency of the secondary winding arrangement.

8. A power generator as claimed in claim 2, characterized in that there is provided an additional parallel resonant circuit which is inductively coupled to the secondary winding arrangement and which is proportioned so that the secondary winding arrangement exhibits parallel resonance at the operating frequency.

9. A power generator as claimed in claim 8, characterized in that the additional winding is formed by a foil which is grounded at one point and is wound about one of the two winding arrangements so that it electrostatically shields it from the other winding arrangement.

10. A power generator as claimed in claim 7, characterized in that a ferromagnetic member which can be positioned relative to the secondary winding arrangement is provided for tuning purposes.

11. A power generator as claimed in claim 1, characterized in that the primary winding arrangement is connected to an alternating current generator and is complemented so as to form a parallel resonant circuit, and that the secondary winding arrangement forms part of a series resonant circuit whose characteristic resistance is substantially higher than the resistance of a load connected thereto.

12. A power generator as claimed in claim 1, characterized in that it is used in a high voltage generator of an X-ray generator.

13. A power generator as claimed in claim 3, characterized in that the characteristic impedance of the parallel resonant circuit is of the order of magnitude of the load resistance or more.

14. A power generator is claimed in claim 3, characterized in that the secondary winding arrangement comprises a plurality of series-connected sub-windings.

15. A power generator is claimed in claim 13, characterized in that the secondary winding arrangement comprises a plurality of series-connected sub-windings.

16. A power generator as claimed in claim 14, characterized in that the sub-windings are inductively coupled to one another.

17. A power generator as claimed in claim 15, characterized in that the sub-windings are inductively coupled to one another.

18. A power generator as claimed in claim 3, characterized in that the operating frequency corresponds to a self-resonance frequency of the secondary winding arrangement.

19. A power generator as claimed in claim 4, characterized in that the operating frequency corresponds to a self-resonance frequency of the secondary winding arrangement.

20. A power generator as claimed in claim 6, characterized in that the operating frequency corresponds to a self-resonance frequency of the secondary winding arrangement.

* * * * *